(12) United States Patent
Okamoto et al.

(10) Patent No.: US 12,325,569 B2
(45) Date of Patent: Jun. 10, 2025

(54) WATER-SOLUBLE FILM AND PACKAGE

(71) Applicant: KURARAY CO., LTD., Okayama (JP)

(72) Inventors: Minoru Okamoto, Okayama (JP);
Sayaka Shimizu, Okayama (JP);
Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 708 days.

(21) Appl. No.: 17/574,792

(22) Filed: Jan. 13, 2022

(65) Prior Publication Data
US 2022/0135301 A1     May 5, 2022

Related U.S. Application Data

(63) Continuation of application No. PCT/JP2020/027450, filed on Jul. 15, 2020.

(30) Foreign Application Priority Data

Jul. 17, 2019   (JP) .................................. 2019-131681

(51) Int. Cl.
*B65D 65/46*      (2006.01)
*B29C 41/00*      (2006.01)
(Continued)

(52) U.S. Cl.
CPC ............ *B65D 65/46* (2013.01); *B29C 41/003* (2013.01); *B29C 41/46* (2013.01); *C08J 5/18* (2013.01);
(Continued)

(58) Field of Classification Search
CPC ....... B65D 65/46; B29C 41/003; B29C 41/46; C08J 5/18; C08J 2329/04; B29K 2031/04; B29K 2995/0062; B29L 2007/008
See application file for complete search history.

(56) References Cited

U.S. PATENT DOCUMENTS

| | | | | |
|---|---|---|---|---|
| 2008/0113173 A1* | 5/2008 | Hayakawa | ................. | C08J 5/18 428/220 |
| 2010/0086788 A1* | 4/2010 | Tsuji | ................. | B32B 17/10577 525/61 |
| 2016/0361462 A1* | 12/2016 | Yim | ...................... | B32B 27/306 |

FOREIGN PATENT DOCUMENTS

| | | |
|---|---|---|
| JP | 2017-110213 A | 6/2017 |
| JP | 2017119434 A * | 7/2017 |

OTHER PUBLICATIONS

Office Action issued for the corresponding Chinese application No. 202080044802.6, dated May 1, 2024.
(Continued)

*Primary Examiner* — Travis M Figg
(74) *Attorney, Agent, or Firm* — Morgan, Lewis & Bockius LLP

(57) ABSTRACT

There is provided a water-soluble film containing polyvinyl alcohol resin, wherein a ratio RSm (LD/TD) is 1.2 or greater and 2.5 or less, where the RSm (LD/TD) is the ratio of an average length RSm (LD) of roughness curve elements on at least one film surface in the longitudinal direction to an average length RSm (TD) of roughness curve elements on the same film surface in the transverse direction. This allows provision of a water-soluble film that can be suitably used for manufacturing a package with excellent uniformity of seal strength, even for manufacturing a package with excellent uniformity of seal strength during high-speed sealing; and a package using the film.

20 Claims, 1 Drawing Sheet

(51) Int. Cl.
   *B29C 41/46* (2006.01)
   *B29K 31/00* (2006.01)
   *B29L 7/00* (2006.01)
   *C08J 5/18* (2006.01)

(52) U.S. Cl.
   CPC .. *B29K 2031/04* (2013.01); *B29K 2995/0062* (2013.01); *B29L 2007/008* (2013.01); *C08J 2329/04* (2013.01)

(56) References Cited

OTHER PUBLICATIONS

International Search Report issued in related International Patent Application No. PCT/JP2020/027450 dated Oct. 6, 2020.

\* cited by examiner

WATER-SOLUBLE FILM AND PACKAGE

TECHNICAL FIELD

The present invention relates to a water-soluble film containing polyvinyl alcohol resin suitably used for packaging various chemicals etc., and a package using the film.

BACKGROUND ART

Conventionally, water-soluble films have been used in a wide variety of fields such as packaging for various chemicals, such as liquid cleaners, pesticides, and disinfectants, and seed tape including seeds, utilizing its excellent solubility in water.

Polyvinyl alcohol resin (may be abbreviated as PVA hereafter) is primarily used for such applied water-soluble films Unevenness is provided to the film surface for improving matting and slipperiness between films Method of providing unevenness may be a method of forming a film from a film forming solution, which results from adding a filler to a PVA aqueous solution, or method of embossing a formed film (Patent Document 1, for example).

Patent Document 2 discloses a chemical packaging body manufacturing method of providing a chemical packaging body having excellent appearance characteristics through bonding together embossed surfaces or non-embossed surfaces when bonding together water-soluble films.

PRIOR ART DOCUMENTS

Patent Documents

Patent Document 1: JP 2017-119434A
Patent Document 2: JP 2017-110213A

DISCLOSURE OF THE INVENTION

Problems to be Solved by the Invention

In recent years, packaging bodies having a high-quality appearance and glossiness have been in high demand from the perspective of design. In this case, a packaging body is manufactured such that surfaces having large unevenness such as embossed surfaces are bonded together, and that the surface with small unevenness is on the front surface side. Meanwhile, to improve productivity, increase in packaging bag manufacturing speed is desired, and sealing may be carried out at a high speed. However, if sealing is carried out at a high speed, water to be coated as a paste may be coated unevenly, and air may not be sufficiently discharged out from the packaging body, remaining in the seal portion as a seal defect, thereby easily making seal strength be uneven. As a result, the packaging bag may tear from the portion with a weak seal strength, and leaking content therefrom.

The present invention aims to provide a water-soluble film that can be suitably used for manufacturing a packaging body with excellent uniformity of seal strength, even for manufacturing a packaging body with excellent uniformity of seal strength during high-speed sealing, and a packaging body using the film.

Means of Solving the Problems

As a result of intensive studies made by the present inventors, focusing on line roughness in the longitudinal direction of a water-soluble film surface, which contains polyvinyl alcohol resin, and line roughness in the transverse direction thereof, it has been found that the problems given above are resolved particularly by setting within a specified range the ratio between the average lengths of roughness curve elements in the longitudinal direction and the transverse direction. Through further study based on these findings, the present invention has been completed.

Namely, the present invention relates to:

[1] a water-soluble film containing polyvinyl alcohol resin, wherein a ratio RSm (LD/TD) is 1.2 or greater and 2.5 or less, where the RSm (LD/TD) is the ratio of an average length RSm (LD) of roughness curve elements on at least one film surface in the longitudinal direction to an average length RSm (TD) of roughness curve elements on the same film surface in the transverse direction.

Moreover, the present invention relates to:

[2] the water-soluble film described in Item [1], wherein the film surface includes a plurality of convex shapes having long sides in the longitudinal direction;

[3] the water-soluble film described in Item [2], wherein an average aspect ratio of the convex shapes is 2 or greater and 10 or less;

[4] the water-soluble film described in either Item 2 or Item 3, wherein average height of the convex shapes is 0.5 µm or greater and 5 µm or less;

[5] the water-soluble film described in any one of Item 2 to Item 4, wherein average width of the convex shapes is 10 µm or greater and 50 µm or less, and average length is 30 µm or greater and 100 µm or less;

[6] the water-soluble film described in any one of Item 2 to Item 5, wherein the convex shapes are provided through transfer during film formation;

[7] the water-soluble film described in any one of Item 2 to Item 6, wherein the convex shapes are provided through embossing;

[8] the water-soluble film described in any one of Item 1 to Item 7, wherein a front/back ratio Ra (M/G) of arithmetic average roughness Ra of the film surface is 2 or greater and 10 or less; and

[9] the water-soluble film described in any one of Item 1 to Item 8, wherein the film surface having the RSm (LD/TD) of 1.2 or greater and 2.5 or less is a matte surface.

Furthermore, the present invention relates to:

[10] a package, including the water-soluble film described in any one of Item 1 to Item 9, which is stored with chemicals;

[11] the package described in Item 10, including a glossy surface that is an outer surface; and

[12] the package described in either Item 10 or Item 11, wherein the chemicals are pesticides, cleaners, or disinfectants.

Results of the Invention

According to the present invention, a water-soluble film that can be suitably used for manufacturing a package with excellent uniformity of seal strength, even for manufacturing a package with excellent uniformity of seal strength during high-speed sealing, and a package using the film are provided.

DESCRIPTION OF EMBODIMENTS

Figure 1:
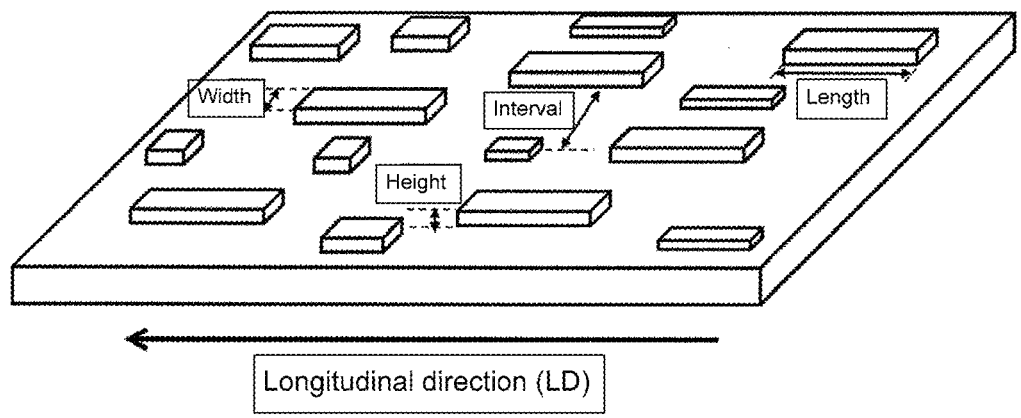
FIG. 1 is a schematic diagram of an example of convex shapes on a water-soluble film surface according to the present invention.

The present invention is described in detail below.

The water-soluble film of the present invention contains polyvinyl alcohol resin (PVA). Moreover, the water-soluble film of the present invention is a water-soluble film having the ratio RSm (LD)/RSm (TD) (may be referred to as RSm (LD/TD) hereafter) of 1.2 or greater and 2.5 or less, wherein RSm (LD) denotes the average length of roughness curve elements in the longitudinal direction of at least one surface of the film and RSm (TD) denotes the average length of the roughness curve elements in the transverse direction of the same. Here, the longitudinal direction of the film surface denotes the main orientation direction of PVA molecules of the film. Furthermore, the transverse direction denotes the vertical direction to the longitudinal direction and is parallel to the film surface.

<Film Surface Roughness>

With the present invention, the average length of roughness curve elements RSm, which is obtained by measuring film surface roughness using a confocal laser microscope (e.g., 'OLS3100' manufactured by Olympus Corporation), is used as an index for film surface roughness. The confocal laser microscope is different from typical optical microscopes, and uses a laser beam having a specific wavelength and excellent linearity, detecting only light having a focal point on the sample surface through an objective lens. With this optical system, most of the reflective light not from the focal point is cut out, whereby only information of focal point position is obtained. Since the confocal laser microscope has resolution along the optical axis (along the sample thickness), 3-dimensional measurement of surface unevenness is possible. The average length of roughness curve elements RSm is a parameter for line roughness, which is found through measurement of roughness of a solid body surface and is specified in JIS B 0601-2001.

When the average lengths of roughness curve elements RSm in the longitudinal direction and the transverse direction of the water-soluble film surface are measured respectively using the confocal laser microscope described above, the RSm (LD/TD) of at least one of the film surfaces of the water-soluble film according to the present invention falls within the range of 1.2 or greater and 2.5 or less. The RSm (LD/TD) being within the range given above results in a film with excellent uniformity of seal strength. This means that the average length of the tops or bottoms constituting the contour elements in the longitudinal direction is greater than that of the same constituting the contour elements in the transverse direction, namely, that the tops or bottoms of the film surface are longer in the longitudinal direction. It can thereby be considered that uniformity of seal strength is improved since when coating the film surface with a paste, the coated paste easily flows in the longitudinal direction, and the paste is thus coated uniformly. The RSm (LD/TD) is preferably 1.4 or greater. The RSm (LD/TD) is preferably 2.0 or less from the perspective of productivity.

The average length of roughness curve elements in the longitudinal direction: RSm (LD) is preferably 10 μm or greater and 30 μm or less from the perspective of uniformity of seal strength. On the other hand, the average length of roughness curve elements in the transverse direction: RSm (TD) is preferably 5 μm or greater and 20 μm or less, further preferably 5 μm or greater and 15 μm or less from the perspective of seal strength.

When the arithmetic average roughness Ra of each surface of the film is measured using the same confocal laser microscope as described above, the ratio of arithmetic average roughness Ra of both surfaces, that is, front/back ratio (may be referred to as Ra (M/G) hereafter) of arithmetic average roughness Ra is preferably 2 or greater and 10 or less. The Ra (M/G) being within the region given above results in easily having both uniformity of seal strength when sealing at a high speed, and a favorable outer appearance of the resulting packaging bag. Ra (M/G) is preferably 3 or greater and 7 or less. Note that the front/back ratio Ra (M/G) of Ra is found by measuring the arithmetic average roughness Ra of each film surface and dividing the Ra (Ra(M)) of a matte surface by the Ra (Ra(G)) of a glossy surface, where the glossy surface denotes the surface with the smaller Ra and the matte surface denotes the surface with the larger Ra. The arithmetic average roughness Ra of each film surface, namely the matte surface and the glossy surface, results from measuring the arithmetic average roughness Ra in the longitudinal direction and the transverse direction of the water-soluble film and taking the average value thereof. The Ra(G) is preferably 0.5 μm or less, more preferably 0.4 μm or less. If the Ra(G) is within the region given above, the obtained packaging bag has excellent glossiness. Moreover, the RSm (LD/TD) of the matte surface is preferably within the range given above.

<Film Surface Form>

The water-soluble film according to the present invention preferably has multiple convex shapes, which have long sides in the longitudinal direction, on at least one of the film surfaces. Since the film surface having convex shapes arranged in the longitudinal direction makes it easy for a paste to flow in the longitudinal direction when coating the film surface with the paste, the paste is applied uniformly, and a result of the present invention of improving uniformity of seal strength is easily achieved. The convex shapes may be approximately rectangular or approximately elliptical.

The surface form of the film may be observed using the confocal laser microscope in the same manner as observing surface roughness. In this patent description, as illustrated in the schematic diagram of FIG. 1, for example, the long side is set as length and the short side is set as width in the case where the convex shapes are approximately rectangular. The average of the lengths and average of the widths of 100 arbitrary convex shapes are taken as average length and average width, respectively. As illustrated in FIG. 1, distance from the flat part surrounding a convex shape to the highest position of the convex shape is taken as height, and the average of the heights of the 100 arbitrary convex shapes is taken as an average height. Moreover, distance between two adjacent convex shapes in the transverse direction is called interval, and the average of the intervals between 100 arbitrary paired adjacent convex shapes is taken as an average interval.

Figure 2:
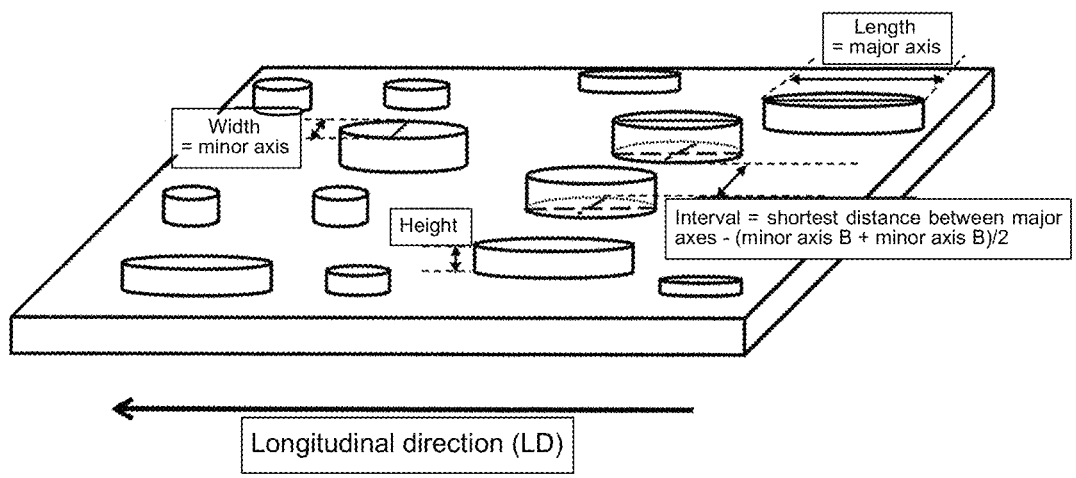
FIG. 2 is a schematic diagram of another example of convex shapes on the water-soluble film surface according to the present invention.

While FIG. 1 illustrates the case where the convex shapes are approximately rectangular, the same holds true even when the convex shapes are approximately elliptical, as illustrated in the schematic diagram of FIG. 2. When the convex shapes are approximately elliptical, the major axis is taken as length, the minor axis is taken as width, and average length and average width are defined in the same manner as when the convex shapes are approximately rectangular. Even when the convex shapes are approximately elliptical, distance from the flat part surrounding a convex shape to the maximum height position of the convex shape is taken as height, and the average of the heights of the 100 arbitrary convex shapes is taken as an average height. Moreover, the value resulting from subtracting half of the sum of the lengths along respective minor axes (minor axis A and minor axis B in FIG. 2) from the shortest distance between two adjacent convex shapes in the respective transverse directions of the respective major axes is take as an interval, and the average of intervals between 100 arbitrary paired adjacent convex shapes is taken as an average interval.

When the convex shapes are approximately rectangular, the lengths are preferably parallel to the longitudinal direction of the film, as illustrated in FIG. 1. When the convex shapes are approximately elliptical, the major axes are preferably parallel to the longitudinal direction of the film. Moreover, the respective convex shapes are preferably parallel to each other. Note that when the respective convex shapes are not parallel, width of the two adjacent convex shapes described above is the minimum distance.

The average width of the convex shapes is preferably 10 μm or greater and 50 μm or less. If the average width is within this range, they exhibit excellent independence as projections, wherein a sufficient effect as projections without bending when pressed during sealing is achieved. Moreover, the projections occupy an appropriate area of the film surface, achieving a sufficient effect as projections. The average width is preferably 15 μm or greater and 30 μm or less.

The average length of the convex shapes is preferably 30 μm or greater and 100 μm or less. As a result of the average length being within the range given above, an average aspect ratio of the convex shapes described later falls within an appropriate range, and uniformity of seal strength is improved. The average length is further preferably 40 μm or greater and 80 μm or less.

The average aspect ratio of the convex shapes is preferably 2 or greater and 10 or less. The average aspect ratio here is a value resulting from dividing the average length of the convex shapes by the average width. If the average aspect ratio is within this range, uniformity of seal strength is easily secured by controlling the paste from escaping sideways when sealing in the longitudinal direction. Moreover, uniformity of seal strength is easily secured by securing an escape route for air when sealing so as to reduce seal defects.

The average height of the convex shapes is preferably 0.5 μm or greater and 5 μm or less. If the average height is too small, an effect as a projection cannot be sufficiently achieved. On the other hand, if the average height is too large, difference in film thickness in the film may be a cause for uneven water solubility. The average height is preferably 1 μm or greater and 4 μm or less.

The average interval (average pitch) between convex shapes is preferably 10 μm or greater and 30 μm or less. If the average interval is within this range, an escape route for the coated paste is easily secured, and accumulation of air in the sealing direction is easily controlled.

With the present invention, it is important to control the RSm (LD/TD) within the range given above. The control method may be, for example, a method of adjusting the type of polyvinyl alcohol resin (saponification degree, modification degree, blend ratio of unmodified PVA to modified PVA, etc.), a method of adjusting an added amount of a plasticizer, a method of adding an organic or inorganic filler, a method of adjusting film forming conditions (support surface temperature, heat treatment conditions, drawing conditions, etc.), a method of adjusting unevenness of the support surface, a method of adjusting embossing conditions (film moisture content, processing temperature, processing pressure, processing time, etc.), or a method of adjusting using a combination of these methods. Of these methods, the method of adjusting unevenness of the support surface and method of adjusting embossing conditions make it easy to control the unevenness of the film surface, and are thus preferred.

<Polyvinyl Alcohol Resin>

The water-soluble film of the present invention contains polyvinyl alcohol resin (PVA).

It is possible to use PVA formed by saponifying a vinyl ester copolymer, which is obtained by polymerizing a vinyl ester monomer.

For example, vinyl formate, vinyl acetate, vinyl propionate, vinyl valerate, vinyl laurate, vinyl stearate, vinyl benzoate, vinyl pivalate, and vinyl versatate are available as the vinyl ester monomer, wherein vinyl acetate is most preferable as the vinyl ester monomer.

The vinyl ester copolymer is obtained preferably using one or two or more kinds of only the vinyl ester monomers as monomers, and obtained more preferably using only one kind of the vinyl ester monomers as the monomer. Note that the vinyl ester copolymer may be a copolymer made from one or two or more kinds of the vinyl ester monomers and another monomer that can be copolymerized.

The other monomer may be ethylene; an olefin having 3 to 30 carbon atoms, such as propylene, 1-butene, or isobutene; acrylic acid or a salt thereof; an acrylic ester, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid or a salt thereof; a methacrylic ester, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, or octadecyl methacrylate; an acrylamide derivative, such as acrylamide, N-methylacrylamide, N-ethylacrylamide, N,N-dimethylacrylamide, diacetone acrylamide, acrylamide propyl dimethylamine or a salt thereof, acrylamide propyldimethylamin or a salt thereof, or N-methylolacrylamide or a derivative thereof; a methacrylamide derivative, such as methacrylamide, N-methylmethacrylamide, N-ethylmethacrylamide, methacrylamide propyldimethylamin or a salt thereof, or N-methylolmethacrylamide or a derivative thereof; an N-vinylamide, such as N-vinylformamide, N-vinylacetamide, or N-vinylpyrrolidone; a vinyl ether, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; a vinyl cyanide such as acrylonitrile or methacrylonitrile; a vinyl halide such as vinyl chloride, vinylidene chloride, vinyl fluoride, or vinylidene fluoride; an allyl compound, such as allyl acetate or allyl chloride; maleic acid or a salt thereof, an ester or an acid anhydride thereof; itaconic acid or a salt thereof, an ester or an acid anhydride thereof; a vinylsilyl compound, such as vinyltrimethoxysilane; or isopropenyl acetate.

Note that the vinyl ester copolymer may have structural units derived from one or more types of these other monomers.

The ratio of the structural units derived from the other monomers to the vinyl ester copolymer (may be referred to as 'modification degree' hereafter), from the perspective of improving both sealing property and mechanical strength of the water-soluble film, is preferably 15 mol % or less, more preferably 5 mol % or less based on the mol numbers of all of the structural units configuring the vinyl ester copolymer. If the ratio of the structural units derived from the other monomers is too high, adjustment of unevenness of the film surface may be difficult.

While the polymerization degree of PVA is not particularly limited, it is preferably within the range given below. That is, the lower limit of the polymerization degree is preferably 200 or greater, more preferably 300 or greater, even more preferably 500 or greater from the perspective of securing sufficient mechanical strength of the water-soluble film. On the other hand, the polymerization degree is preferably 8,000 or less, more preferably 5,000 or less, even more preferably 3,000 or less from the perspective of heightening productivity of PVA and of the water-soluble film.

Here, polymerization degree means the average polymerization degree measured in accordance with JIS K 6726-1994. That is, in this patent description, once a residual acetate group of PVA is saponified and purified, the limiting viscosity [η] (unit: deciliter/g) is measured in water at 30° C. so as to find the polymerization degree using the following equation.

$$\text{Polymerization degree } Po=([\eta]\times 10^{4}/8.29)^{(1/0.62)}$$

According to the present invention, a value resulting from subtracting the above modification degree from the saponification degree of PVA is preferably 64 to 97 mol %. Adjusting the value within this range makes it easy to adjust unevenness of the film surface, and allows having both good seal efficiency and mechanical strength of the water-soluble film. The value is more preferably 70 mol % or greater, and even more preferably 75 mol % or greater. On the other hand, the value is more preferably 93 mol % or less, even more preferably 91 mol % or less, most preferably 90 mol % or less.

This saponification degree of PVA is the ratio (mol %) of the number of mols of a vinyl alcohol unit to total number of mols of the vinyl alcohol unit and a structural unit (typically a vinyl ester monomer unit) of the PVA that can be converted to the vinyl alcohol unit through saponification.

The saponification degree of PVA may be measured in accordance with JIS K 6726-1994.

One type of PVA alone may be used for the water-soluble film, or otherwise a blend of two or more types of PVA that differ in polymerization degree, saponification degree, and/or modification degree may be included.

The content of PVA in the water-soluble film is preferably 100 mass % or less. On the other hand, the content of PVA is preferably 50 mass % or greater, more preferably 80 mass % or greater, even more preferably 85 mass % or greater.

<Plasticizer>

The water-soluble film preferably contains a plasticizer. The same equivalent flexibility as that of other plastic films may be added to the water-soluble film by containing the plasticizer. As a result, mechanical properties such as impact strength etc. and passability through processing steps at the time of secondary processing etc. of the water-soluble film are favorable.

The plasticizer may be ethylene glycol, glycerine, diglycerine, propylene glycol, diethylene glycol, triethylene glycol, tetraethylene glycol, trimethylolpropane, and sorbitol etc. These plasticizers may be used alone, or in combination of two types or more. Of these plasticizers, ethylene glycol and glycerine are preferable, and glycerine is more preferable from the perspective that bleeding out to the water-soluble film surface is controlled.

Content of the plasticizer in the water-soluble film is preferably 1 part mass or greater, more preferably 3 parts mass or greater, even more preferably 5 parts mass or greater to 100 parts mass PVA. On the other hand, content of the plasticizer is preferably 70 parts mass or less, more preferably 50 parts mass or less, and even more preferably 40 parts mass or less. When the content of the plasticizer is within the range given above, easy adjustment of unevenness of the film surface is possible, and thus mechanical properties of the water-soluble film, such as impact strength etc., may be sufficiently improved. Moreover, it may suitably prevent or control occurrence of problems, such as the water-soluble film becoming too soft, decreasing handleability, and bleeding out to the surface.

<Starch/Water-Soluble Polymer>

The water-soluble film may contain a water-soluble polymer other than starch and/or PVA. Containing a water-soluble polymer other than starch and/or PVA makes it possible to add mechanical strength to the water-soluble film, maintain moisture resistance of the water-soluble film when handling it, or adjust the speed of softening of the water-soluble film due to absorption of water when dissolving the film.

Examples of starch are natural starches, such as cornstarch, potato starch, sweet potato starch, wheat starch, rice starch, tapioca starch, and sago starch; and processed starches treated with etherification, esterification, oxidation etc., wherein the processed starches are particularly preferred.

Content of starch in the water-soluble film is preferably 15 parts mass or less, more preferably 10 parts mass or less to 100 parts mass PVA. When the content of starch is within the range given above, deterioration in passability through processing steps of the water-soluble film may be prevented or controlled.

The water-soluble polymer other than PVA may be dextrin, gelatin, glue, casein, shellac, gum arabic, polyacrylate amide, sodium polyacrylate, polyvinyl methyl ether, a copolymer of methyl vinyl ether and maleic anhydride, a copolymer of vinyl acetate and itaconic acid, polyvinyl pyrrolidone, cellulose, cellulose acetate, acetylbutyl cellulose, carboxymethyl cellulose, methyl cellulose, ethyl cellulose, hydroxyethyl cellulose, and sodium alginate, for example.

Content of the water-soluble polymer other than PVA in the water-soluble film is preferably 15 parts mass or less, more preferably 10 parts mass or less to 100 parts mass PVA. When the content of the water-soluble polymer other than PVA is within the region given above, unevenness of the film surface is easily adjusted, and water solubility of the water-soluble film may be heightened sufficiently.

<Surfactant>

The water-soluble film preferably contains a surfactant. Containing a surfactant improves handleability of the water-soluble film and detachability from a film formation apparatus when manufacturing.

While the surfactant is not particularly limited, an anionic surfactant or a nonionic surfactant, for example, may be used.

The anionic surfactant may be a carboxylic acid type surfactant, such as potassium laurate; a sulfuric ester type surfactant, such as octyl sulfate; or a sulfonic acid type surfactant, such as dodecylbenzene sulfonate, for example.

The nonionic surfactant may be an alkyl ether type surfactant, such as polyoxyethylene lauryl ether or polyoxyethylene oleyl ether; an alkylphenyl ether type surfactant, such as polyoxyethylene octylphenyl ether; an alkyl ester type surfactant, such as polyoxyethylene laurate; an alkylamine type surfactant, such as polyoxyethylene lauryl aminoether; an alkylamide type surfactant, such as polyoxyethylene laurate amide; a polypropylene glycol ether type surfactant, such as polyoxyethylene-polyoxypropylene ether; an alkanolamide type surfactant, such as diethanolamide laurate or diethanolamide oleate; or an allyphenyl ether type surfactant, such as polyoxyalkylene allyphenyl ether.

Such surfactants may be used alone, or in combination of two types or more. Of these surfactants, the nonionic surfactants are preferable from the perspective of excellent reduction effect of surface abnormalities such as streak-like defects at the time of formation of the water-soluble film. More specifically, an alkanolamide type surfactant is more preferable, dialkanolamide (e.g., diethanolamide etc.) of aliphatic carboxylic acid (e.g., saturated or unsaturated aliphatic carboxylic acid having 8 to 30 carbon atoms) is even more preferable.

Surfactant content in the water-soluble film is preferably 0.01 parts mass or greater, more preferably 0.02 parts mass or greater, even more preferably 0.05 parts mass or greater to 100 parts mass PVA. On the other hand, the surfactant content is preferably 10 parts mass or less, more preferably 1 part mass or less, even more preferably 0.5 parts mass or less, and most preferably 0.3 parts mass or less to 100 parts mass PVA. When the surfactant content is within the range given above, detachability from a film formation apparatus for the water-soluble film during formation is good, and problems such as blocking between water-soluble films do not occur easily. Moreover, problems such as bleeding out of the surfactant to the water-soluble film surface and/or deterioration of film appearance due to coagulation of the surfactant do not occur easily.

<Other Components>

The water-soluble film may contain, within a range not inhibiting the results of the present invention, components such as plasticizer, starch, water-soluble polymers other than PVA, and surfactants, and may also contain moisture, oxidation inhibitor, ultraviolet light absorber, lubricant, cross-linking agent, colorant, filler, preservative, anti-mold agent, and other polymer compounds, etc.

The ratio of the total mass of PVA, plasticizer, starch, water-soluble polymers other than PVA, and surfactant to mass of the water-soluble film is preferably 60 to 100 mass %, more preferably 80 to 100 mass %, and even more preferably 90 to 100 mass %.

<Water-Soluble Film>

While the complete dissolution time of the water-soluble film according to the present invention when immersed in 10° C. deionized water is not particularly limited, the range given below is preferred. The complete dissolution time is preferably within 300 seconds, even more preferably within 200 seconds. The water-soluble film having a complete dissolution time upper limit within the range given above may be suitably used as a film for packaging (for packaging material) of chemicals and the like since it completely dissolves at a relatively early stage. On the other hand, the complete dissolution time is preferably 5 seconds or more, further preferably 10 seconds or more, even further preferably 15 seconds or more, and most preferably 20 seconds or more. If the water-soluble film has a complete dissolution time that is not too short in this manner, problems such as blocking between films due to moisture absorption in the atmosphere, and/or decrease in mechanical strength do not occur easily.

The complete dissolution time of the water-soluble film when immersed in 10° C. deionized water may be measured in the following manner.

<1> A water-soluble film is placed in a thermo-hygrostat adjusted to 20° C. and 65% RH for 16 hours or more so as to be humidity conditioned.

<2> A rectangular sample 40 mm long and 35 mm wide is cut out from the humidity conditioned water-soluble film, and is sandwiched and fixed between two 50 mm by 50 mm plastic plates, each having a window (hole) 35 mm long and 23 mm wide, such that the longitudinal direction of the sample is parallel to the longitudinal direction of the windows, and that the windows are positioned nearly in the center in the transverse direction of the sample.

<3> 300 mL of deionized water is poured in a 500 mL beaker, and the water temperature is adjusted to 10° C. while stirring at a rotation frequency of 280 rpm using a magnetic stirrer that includes a 3 cm-long bar.

<4> The sample fixed on the plastic plates in Step <2> described above is completely immersed in the deionized water in the beaker while being careful that it does not touch the bar of the magnetic stirrer.

<5> Once it is immersed in the deionized water, time until sample fragments dispersed within the deionized water are completely dissipated is measured through visual observation.

While the complete dissolution time measured by the method described above depends on thickness of the sample, time until the sample with the size given above is completely dissolved is taken as the complete dissolution time irrespective of thickness, in this patent description.

Thickness of the water-soluble film is not particularly limited; however, the range given below is preferred. That is, the thickness is preferably 200 μm or less, more preferably 150 μm or less, even more preferably 100 μm or less. On the other hand, the thickness is preferably 5 μm or greater, more preferably 10 μm or greater, even more preferably 15 μm or greater, and most preferably 20 μm or greater. While decrease in secondary workability of the water-soluble film may be suitably prevented since the thickness within the range given above is not too large, sufficient mechanical strength of the water-soluble film may be secured since the thickness is not too small either.

Note that the thickness of the water-soluble film may be found by measuring thickness at ten arbitrary places (for example, ten arbitrary places along a straight line drawn in the longitudinal direction of the water-soluble film) and taking the average value thereof.

Glossiness of the water-soluble film is not particularly limited; however, in the case of finding the glossiness from the perspective of design, glossiness of the glossy surface is preferably within the range given below. That is, glossiness of the glossy surface is preferably 30 or greater, more preferably 40 or greater, even more preferably 50 or greater. When the glossiness of the glossy surface is within the range given above, a packaging bag obtained when bonding together two water-soluble films such that the glossy surface is an outer surface so as to manufacture a packaging body exhibits excellent glossiness.

<Manufacturing Method of Water-Soluble Film>

The manufacturing method of the water-soluble film according to the present invention is not particularly limited, and the following methods may be used, for example.

Examples of the manufacturing method using a film forming solution made uniform by adding a solvent, an additive etc. to the PVA are a flow-casting film forming method, a wet film forming method (discharge into a poor solvent), a dry film forming method, a gel film forming method (method of temporarily cooling and gelling the film forming solution, and then extracting and removing the solvent), a method of forming a film by a combination of these methods, a melt extrusion film forming method of obtaining the film forming solution using an extruder or the like and extruding it from a T-die etc., thereby forming a film, and an inflation film forming method. Of these methods, the flow-casting film forming method and the melt extrusion film forming method are preferred as the manufacturing method of the water-soluble film Use of these methods allows formation of a homogeneous film with good productivity.

Method of manufacturing using either the flow-casting film forming method or the melt extrusion film forming method for the water-soluble film is described below.

First, a film forming solution containing PVA, a solvent, and an additive such as a plasticizer as needed is prepared. Note that in the case where the film forming solution contains an additive, the proportion of additive to PVA in the film forming solution is effectively equal to proportion of additive to PVA in the obtained water-soluble film described above.

Next, the film forming solution is flow-cast (supplied) in film form onto a support. This forms a liquid coating of the film forming solution on the support. The support may be made of a polymer (e.g., polyethylene terephthalate (PET), polyethylene naphthalate (PEN), acetyl cellulose, polycarbonate, paper, resin laminated paper etc.) or a metal (e.g., iron, copper, aluminum, etc.).

The liquid coating is dried on the support, eliminating the solvent, and thereby being solidified and made into a film. This drying may be sped up by adding heat. The solidified film may be either detached from the support, or further dried as needed using a drying roller, drying furnace etc., and heat treated as needed. Film formation is carried out through a batch method, a semi-batch method, or a continuous method. While storing method of the film is not particularly limited, it may be either wound into a roll form, or (precut and) stacked.

The volatile component rate (concentration of volatile components in a solvent etc. that are removed through volatilization or evaporation during film formation) of the film forming solution is preferably within a range of 50 to 90 mass %, more preferably within a range of 55 to 80 mass %. When the volatile component rate is within the ranges given above, viscosity of the film forming solution may be adjusted within a suitable range, thereby improving film forming characteristics of the water-soluble film (liquid coating), as well as making it easy to obtain a water-soluble film having a uniform thickness.

Here, the 'volatile component rate of the film forming solution' of this patent description denotes a value found using the following equation.

Volatile component rate (mass %) of film forming solution=$\{(Wa-Wb)/Wa\} \times 100$ (where in the equation, Wa denotes mass (g) of the film forming solution, and Wb denotes mass (g) when the film forming solution of Wa (g) is dried for 16 hours in an electric dryer of 105° C.)

While the method of preparing the film forming solution is not particularly limited, it may be a method of dissolving PVA and an additive, such as a plasticizer or a surfactant, in a solution tank, or method of melting and mixing an additive, such as a plasticizer or a surfactant, when melting and mixing PVA that has retained water using a single or twin-screw extruder.

According to an aspect of the present invention, the surface temperature of the support on which the film forming solution is flow casted is preferably 50 to 110° C., more preferably 60 to 100° C., even more preferably 65 to 95° C. When the surface temperature is within the ranges given above, drying of the liquid coating progresses at an efficient speed, and thus neither is time required for drying the liquid coating too long, nor is productivity of the water-soluble film decreased. Moreover, abnormalities of the water-soluble film surface, such as foaming, do not occur easily due to drying of the liquid coating progressing at such a speed.

Simultaneous with heating the liquid coating on the support, hot air may be blown uniformly onto the entire area on a noncontact surface side of the PVA film at a speed of 1 to 10 m per second. This allows adjustment of the drying speed of the liquid coating. The temperature of the hot air blown on the noncontact surface side is preferably 50 to 150° C., more preferably 70 to 120° C. When the temperature of the hot air is within the ranges given above, drying efficiency and drying uniformity of the liquid coating may be further improved.

Once the water-soluble film is dried (solvent removed) on the support until reaching the volatile component rate of 5 to 50 mass %, it is detached from the support, and is further dried as needed. According to another aspect, once the film is completely or effectively dried on the support, it may be stored while on the support and may be subjected to a subsequent step.

The drying method is not particularly limited, and may be a method of passing through a drying furnace, or a method of making physical contact with a drying roller.

In the case of drying the water-soluble film using multiple drying rollers, making either one surface of the film or the other surface thereof have physical contact with the drying rollers alternately is preferred. This allows making the degree of crystallization of PVA on both surfaces of the water-soluble film uniform. In this case, use of 3 or more drying rollers is preferred, 4 or more is further preferred, and 5 to 30 is even further preferred.

Temperature of the drying furnace and drying rollers is preferably 40 to 110° C. The upper limit of the temperature of the drying furnace and drying rollers is preferably 100° C. or lower, more preferably 90° C. or less, even more preferably 85° C. or lower. On the other hand, the lower limit of the temperature of the drying furnace and drying rollers is preferably 45° C. or higher, more preferably 50° C. or higher.

Heat treatment may be further carried out on the water-soluble film after drying as needed. Carrying out heat treatment allows adjustment of characteristics such as mechanical strength, water solubility, birefringence etc. of the water-soluble film. Heat treatment temperature is preferably 60 to 135° C. The upper limit of the heat treatment temperature is more preferably 130° C. or less.

In order to make the water-soluble film surface have a desired surface roughness, a method of providing unevenness to the support surface so as to obtain a water-soluble film having unevenness through transfer at the time of film formation, or a method of providing unevenness to the water-soluble film through embossing may be employed. For example, formation of concave parts having an RSm (LD/TD) of 1.2 or greater and 2.5 or less allows provision of a water-soluble film having the target surface roughness. Moreover, formation of concave parts with long sides in the longitudinal direction of the support surface allows provision of a water-soluble film having convex shapes with long sides in the longitudinal direction. The method of providing unevenness to the support surface so as to obtain a water-soluble film having unevenness at the time of film formation may easily provide a water-soluble film constituted by a matte surface having a suitable RSm (LD/TD) and a glossy surface having a suitable Ra, and provide both uniformity of seal strength at the time of high-speed sealing and good outer appearance, and is thus preferred.

In the case of providing unevenness to the support surface so as to obtain a water-soluble film having unevenness formed through transfer at the time of film formation, the drying temperature of the film is preferably 50 to 170° C., more preferably 60 to 140° C. The drying time on the support is preferably 0.5 to 20 minutes, more preferably 1 to 15 minutes.

In the case of providing unevenness on the water-soluble film through embossing, processing temperature is preferably 60 to 150° C., more preferably 80 to 140° C. Processing pressure is preferably 0.1 to 15 MPa, more preferably 0.3 to 8 MPa. Film transport speed for embossing is preferably 5 m per minute or more, more preferably 10 to 30 m per minute.

The water-soluble film formed in this manner further undergoes humidity conditioning and has either film end part (ear) cut off etc. as needed, and is then wound in a roll form on a cylindrical core, and wrapped in moisture-proof packaging, resulting in a product. According to another aspect, the film is cut etc. into uniform-sized pieces, stacked with a release film inserted as needed, and wrapped in moisture-proof packaging, resulting in a product.

<Applications>

The water-soluble film according to the present invention may be suitably used for various water-soluble film applications to which typical water-soluble films are applied.

The film applications may be chemical package films, base films for hydraulic pressure transfer, base films for embroidery, release films for artificial marble molding, seed package films, and films for waste storage bags, for example. Of these films, the water-soluble film of the present invention is preferably applied to a chemical package film.

In the case of using the water-soluble film of the present invention as a chemical package film, types of chemicals may be pesticides, cleansers (including bleach), disinfectants, or edible chemicals.

While physical properties of the chemicals are not particularly limited, they may be acidic, neutral, or alkaline.

Moreover, the chemicals may include boron-containing compounds or halogen-containing compounds.

The form of the chemicals may be any one of a powder, a solid, or a liquid.

The packaging form is also not particularly limited; however, unit packages for packaging (preferably sealed packaging) a unit quantity of chemical per package are preferred from the perspective of handleability.

Application of the water-soluble film according to the present invention to a chemical package film so as to package chemicals results in provision of the packaging body of the present invention. In other words, the packaging body according to the present invention includes packaging material (capsule) constituted by the water-soluble film according to the present invention, and chemicals included in this packaging material.

Manufacturing a packaging body by bonding together surfaces having a predetermined surface roughness, or otherwise bonding a surface having a desired surface roughness and another surface of the water-soluble film according to the present invention allows provision of a packaging body with excellent uniformity of seal strength.

The method of bonding films together is not particularly limited and may employ a well-known method, such as, for example, a sealing method of heating and compressing stacked films, a method of coating seal surfaces with a paste and compressing them, or a combination thereof. Of these methods, the method of coating seal surfaces with a paste and compressing them, which does not require a heating apparatus, is preferred. In the case of a water-soluble film containing PVA, the paste may be a PVA aqueous solution, a boric acid aqueous solution, water etc., wherein sealing with the water is preferred from the perspective of handleability.

WORKING EXAMPLES

The present invention is described in detail below through working examples; however, the present invention is not limited in anyway by the following working examples. Note that adopted evaluation items and methods thereof in the following working examples and comparative examples are as described below.

(1) Average Length RSm and Arithmetic Average Roughness Ra of Roughness Curve Elements of Film Surface A water-soluble film is fixed on a slide glass, and the surface roughness is analyzed using a laser microscope. The surface roughness is measured from a measurement image at 20× magnification along an arbitrary straight line within a range of approximately 560 µm in the longitudinal direction (LD) of the film and approximately 430 µm in the transverse direction (film forming width direction, TD), and RSm(LD), RSm(TD), Ra(LD), and Ra(TD) along the measured line are then calculated by the apparatus automatically. Measured places are changed, measurement is carried out at ten places along the straight line, and the resulting average value is taken as an analyzed value. The average value of Ra (LD) and Ra (TD) is taken as Ra of the film surface, Ra of the matte surface is set as Ra(M), and Ra of the glossy surface is set as Ra(G). Detailed measuring conditions and calculation conditions are as given below.

Measuring apparatus: OLS3100 (manufactured by Olympus Corporation)
    Measuring conditions: Manual measurement, Pitch: 0.30, Steps: approximately 80 to 150 (appropriately adjusted according to sample)
    Identification of minimum height: Cross-sectional curve: 10% of Pz, Roughness curve: 10% of Rz, Meandering curve: 10% of Wz
    Identification of minimum length: 1% of standard length (screen view)
    Load length ratio to be calculated for cutting level difference: Rmr1: 30%, Rmr2: 60%

(2) Observation of Film Surface Form

Measurement images at 20× magnification are obtained from five film samples under the same conditions as in Item (1) described above. The entire measuring field of approximately 430 µm by 560 µm per obtained image is set as a measuring range, 20 projections are selected from the respective fields, making a total of 100 projections, and shapes thereof are measured using a length measuring software program and a height measuring software program included in analysis software programs of the measuring apparatus (OLS3100).

(3) Glossiness

Square samples of a water-soluble film, each having dimensions of approximately 5 cm in the longitudinal direction (LD) and approximately 5 cm in the transverse direction (TD), are cut out, and kept for 16 hours or longer in an environment of 23° C. and 35% RH (Relative Humidity) so as to be humidity conditioned. Glossiness of glossy surfaces of the humidity conditioned samples is measured at an angle of 60 degrees in the LD direction and the TD direction based on JIS Z 8741-1997, and the average value is taken as the glossiness.

(4) Seal Strength

Matte surfaces of the water-soluble film are bonded together using a water seal, and seal strength and unevenness are measured.

Oblong samples of a water-soluble film, each having dimensions of approximately 30 cm in the longitudinal direction (LD) and approximately 10 cm in the transverse direction (TD), are cut out, and kept for 16 hours or longer in an environment of 23° C. and 35% RH (Relative Humidity) so as to be humidity conditioned. One of the humidity conditioned samples is placed on a stand in the same environment, and the four corners of the film are fixed using adhesive tape. One more sample is stacked thereupon, both ends of respective 10 cm sides are fixed using adhesive tape, and the unfixed ends are passed through an ESIPROOF proofing roller using a 140/10 anilox roller. 0.5 mL of deionized water is poured on a doctor blade of the ESI-PROOF proofing roller, and the roller is pulled at a speed of approximately 7.5 cm/sec, bonding the two films together. Note that at this time, since the roller is set to the chuck of a tension tester without being pulled to the end of the film, a part not bonded to the end of the film is left. Three short strip test pieces having a width of 25 mm and LD as long sides are cut out from the bonded samples. The above operation is repeated two more times, thereby making nine test pieces.

Once the test pieces are bonded and left for ten minutes, they are set in a tension tester, peeled at a tension rate of 254 mm per minute in conformity to a T-peel test based on JIS K6854-3: 1999, and the average value of detaching force of the three obtained test pieces is taken as the adhesive force. The average value of detaching force of the nine obtained test pieces is taken as the seal strength, where the coefficient of variation (value resulting from dividing the standard deviation by the average value) is an index of uniformity of seal strength.

Working Example 1

A film forming solution is prepared by mixing 100 parts mass PVA (saponification degree of 88 mol %, and viscosity-average polymerization degree of 1700) obtained by saponifying polyvinyl acetate; 25 parts mass glycerine as a plasticizer; 0.1 parts mass diethanolamide laurate as a surfactant; and water. Note that the volatile component rate of the film forming solution is 68 mass %.

Next, using a metal support provided with multiple concave parts that have long sides in the longitudinal direction (winding direction, LD) on the surface, the film forming solution is discharged from a T-die onto the metal support (at a surface temperature of 85° C.) such that a film form is generated, thereby forming a liquid coating on the metal support. A type having surfaces including approximately elliptic-shaped unevenness is used as the metal support. Hot air of 110° C. is blown onto the entirety of the liquid coating on the metal support that does not make contact with the metal support so as to dry it. As a result, a water-soluble film is obtained.

Next, the water-soluble film is detached from the metal support. The obtained water-soluble film is 76 μm thick.

Moreover, the complete dissolution time of the obtained water-soluble film when immersed in 10° C. deionized water is 195 seconds when measured through the method described above.

Working Example 2

Aside from replacing the PVA used for preparing the film forming solution with monomethyl maleate (MMM) modified PVA (saponification degree of 90 mol %, polymerization degree of 1700, and MMM modification degree of 5 mol %) of which the glycerine blending amount is changed to 45 parts mass, a water-soluble film is obtained in the same manner as in Working Example 1. Surface roughness, surface form, glossiness and seal strength of the obtained water-soluble film are measured. The results are given in Table 1. Note that the complete dissolution time of the obtained water-soluble film when immersed in 10° C. deionized water is 97 seconds, which is found using the method described above.

Comparative Example 1

Using the same film forming solution as in Working Example 1, the film forming solution is discharged from a T-die upon a metal roller (at surface temperature of 80° C.), which is a support, such that a film form is generated, thereby forming a liquid coating on the metal roller. Hot air of 85° C. is blown onto the entirety of the liquid coating on the metal roller that does not make contact with the metal roller so as to dry it. This provides a water-soluble film Next, the water-soluble film is detached from the metal roller, and one surface and the other surface of the water-soluble film make physical contact with multiple drying rollers (at surface temperature of 75° C.) alternately so as to dry it. Next, using a rubber backup roller and an emboss roller having a satin pattern of 3 μm surface roughness (arithmetic average roughness Ra) on the surface not making contact with the metal roller, the film is embossed while advancing at a speed of 12 m per minute under the conditions of an emboss roller temperature of 120° C., backup roller temperature of 50° C., and a linear pressure of 25 kg/cm, and is then wound in a roll form on a cylindrical core. The thickness of the obtained water-soluble film is 76 μm.

Surface roughness, glossiness and water seal strength of the obtained water-soluble film are measured. The results are given in Table 1.

Comparative Example 2

Aside from changing the film forming solution to be used to the same solution as in Working Example 2, a water-soluble film is obtained in the same manner as in Comparative Example 1. Surface roughness, glossiness and water seal strength of the obtained water-soluble film are measured. The results are given in Table 1.

TABLE 1

|  | Working Example 1 | Working Example 2 | Comparative Example 1 | Comparative Example 2 |
| --- | --- | --- | --- | --- |
| PVA |  |  |  |  |
| Polymerization degree | 1700 | 1700 | 1700 | 1700 |

TABLE 1-continued

|  | Working Example 1 | Working Example 2 | Comparative Example 1 | Comparative Example 2 |
|---|---|---|---|---|
| Modified | Unmodified | MMMΔ5 | Unmodified | MMMΔ5 |
| Saponification degree [mol %] | 88 | 90 | 88 | 90 |
| Amount of plasticizer [wt %] | 25 | 45 | 25 | 45 |
| Film thickness | 76 | 76 | 76 | 76 |
| Manufacturing method | Transfer | Transfer | Emboss | Emboss |
| Convex shape | Approximate elliptical form | Approximate elliptical form | (Satin) | (Satin) |
| Average length[μm] | 72.1 | 58.7 | — | — |
| Average width[μm] | 16.5 | 19.3 | — | — |
| Average aspect ratio | 4.4 | 3.0 | — | — |
| Average height[μm] | 3.4 | 3.2 | — | — |
| Average pitch [μm] | 18.1 | 15.6 | — | — |
| Matte surface |  |  |  |  |
| RSm(TD)[μm] | 12.6 | 11.5 | 54.8 | 25.8 |
| RSm(LD)[μm] | 21.4 | 15.8 | 34.9 | 20.5 |
| RSm(LD/TD) | 1.7 | 1.4 | 0.6 | 0.8 |
| Ra(M)[μm] | 1.4 | 1.3 | 0.7 | 1.4 |
| Glossy surface |  |  |  |  |
| Ra(G)[μm] | 0.3 | 0.3 | 0.4 | 0.9 |
| Ra(M/G) | 4.7 | 4.3 | 1.8 | 1.6 |
| Seal strength |  |  |  |  |
| Average[N/mm] | 10.2 | 18.2 | 11.0 | 23.1 |
| Coefficient of variation | 0.040 | 0.047 | 0.34 | 0.14 |
| Glossiness | 60.3 | 59.2 | 58.2 | 27.2 |

As is evident from Table 1, the water-soluble film according to the present invention exhibits excellent uniformity of seal strength. By using the water-soluble film according to the present invention for a package that stores chemicals etc., the obtained package may exhibit excellent uniformity of seal strength, and may prevent the package from breaking during storage and transportation. Note that since the water-soluble films of Comparative Examples 1 and 2 did not have any convex shapes on the film surface, measurement of the length etc. of convex shapes was not carried out.

The invention claimed is:

1. A water-soluble film containing polyvinyl alcohol resin, wherein a ratio RSm (LD/TD) is 1.2 or greater and 2.5 or less, where the RSm (LD/TD) is the ratio of an average length RSm (LD) of roughness curve elements on at least one film surface in a longitudinal direction to an average length RSm (TD) of roughness curve elements on the same film surface in a transverse direction.

2. The water-soluble film according to claim 1, wherein the film surface comprises a plurality of convex shapes.

3. The water-soluble film according to claim 1, wherein the film surface comprises a plurality of convex shapes having an average aspect ratio of 2 or greater and 10 or less.

4. The water-soluble film according to claim 1, wherein the film surface comprises a plurality of convex shapes having an average height of 0.5 μm or greater and 5 μm or less.

5. The water-soluble film according to claim 1, wherein the film surface comprises a plurality of convex shapes having an average width of 10 μm or greater and 50 μm or less, and an average length of 30 μm or greater and 100 μm or less.

6. The water-soluble film according to claim 1, wherein the film surface comprises a plurality of convex shapes that are provided through transfer during film formation.

7. The water-soluble film according to claim 1, wherein the film surface comprises a plurality of convex shapes that are provided through embossing.

8. The water-soluble film according to claim 1, wherein a front/back ratio Ra (M/G) of an arithmetic average roughness Ra of the film surface is 2 or greater and 10 or less.

9. The water-soluble film according to claim 1, wherein the film surface having the RSm (LD/TD) of 1.2 or greater and 2.5 or less comprises a matte surface.

10. A package in which a water-soluble film is used for storing chemicals, wherein the water-soluble film contains polyvinyl alcohol resin, and a ratio RSm (LD/TD) is 1.2 or greater and 2.5 or less, where the RSm (LD/TD) is the ratio of an average length RSm (LD) of roughness curve elements on at least one film surface in a longitudinal direction to an average length RSm (TD) of roughness curve elements on the same film surface in a transverse direction.

11. The package according to claim 10, wherein the film surface comprises a plurality of convex shapes.

12. The package according to claim 10, wherein the film surface comprises a plurality of convex shapes having an average aspect ratio of 2 or greater and 10 or less.

13. The package according to claim 10, wherein the film surface comprises a plurality of convex shapes having average height of 0.5 μm or greater and 5 μm or less.

14. The package according to claim 10, wherein the film surface comprises a plurality of convex shapes having an average width of 10 μm or greater and 50 μm or less, and an average length of 30 μm or greater and 100 μm or less.

15. The package according to claim 10, wherein the film surface comprises a plurality of convex shapes that are provided through transfer during film formation.

16. The package according to claim 10, wherein the film surface comprises a plurality of convex shapes that are provided through embossing.

17. The package according to claim 10, wherein the film surface having a front/back ratio Ra (M/G) of an arithmetic average roughness Ra of 2 or greater and 10 or less.

18. The package according to claim 10, wherein the film surface having the RSm (LD/TD) of 1.2 or greater and 2.5 or less comprises a matte surface.

19. The package according to claim 18, wherein an outer surface of the package comprises a glossy surface.

20. The package according to claim 18, wherein the chemicals include at least one selected from the group consisting of pesticides, cleaners, and disinfectants.

* * * * *